United States Patent [19]
Callegari et al.

[11] Patent Number: 6,020,946
[45] Date of Patent: Feb. 1, 2000

[54] DRY PROCESSING FOR LIQUID-CRYSTAL DISPLAYS USING LOW ENERGY ION BOMBARDMENT

[75] Inventors: Alessandro Cesare Callegari, Yorktown Heights; Praveen Chaudhari, Briarcliff Manor; James Patrick Doyle, Bronx; James Andrew Lacey, Mahopac; Shui-Chin Alan Lien, Briarcliff Manor; Sampath Purushothaman, Yorktown Heights, all of N.Y.; Mahesh Govind Samant, San Jose, Calif.; James L. Speidell, Poughquag, N.Y.; Joachim Stohr, Redwood City, Calif.

[73] Assignee: International Business Machines Corporation, Armonk, N.Y.

[21] Appl. No.: 09/028,018
[22] Filed: Feb. 23, 1998
[51] Int. Cl.[7] .............................. G02F 1/1337; C07C 1/00
[52] U.S. Cl. ...................... 349/124; 349/123; 204/157.15
[58] Field of Search ..................................... 349/123, 124, 349/125, 127, 128, 129; 204/157.15

[56] References Cited

U.S. PATENT DOCUMENTS

| | | |
|---|---|---|
| 4,153,529 | 5/1979 | Little et al. ........................... 204/192.3 |
| 4,461,715 | 7/1984 | Lu et al. ............................... 252/299.1 |
| 5,030,322 | 7/1991 | Shimada et al. .......................... 216/23 |
| 5,760,366 | 6/1998 | Haruta et al. ....................... 219/121.68 |
| 5,770,826 | 6/1998 | Chaudhari et al. ................. 204/157.15 |
| 5,793,453 | 8/1998 | Okabe ...................................... 349/86 |
| 5,889,571 | 3/1999 | Kim et al. .............................. 349/124 |

*Primary Examiner*—William L. Sikes
*Assistant Examiner*—Heidi L. Eisenhut
*Attorney, Agent, or Firm*—Ohlandt, Greeley, Ruggiero & Perle

[57] ABSTRACT

The present invention is a method for forming a liquid-crystal cell of a liquid-crystal display. Initially, a dry processed alignment film is deposited onto a first transparent substrate using a dry processing technique, such as plasma enhanced chemical vapor deposition (PECVD). The dry processed alignment film is then irradiated with a beam of atoms to arrange the atomic structure of the alignment film in at least one desired direction in order to orient the liquid-crystal molecules. Another dry processed alignment film is deposited on a second substrate using a dry processing technique and, likewise, irradiated with a beam of atoms. The first transparent substrate and the second substrate are then sandwiched together with their respective alignment films spaced adjacent to each other. The space between the films is then filled with a liquid-crystal material.

32 Claims, 4 Drawing Sheets

DRY PROCESSING FOR LIQUID-CRYSTAL DISPLAYS USING LOW ENERGY ION BOMBARDMENT

CROSS-REFERENCE TO RELATED APPLICATIONS

This application is related to Application Serial No. 09/027,997, entitled "ALIGNMENT OF LIQUID CRYSTAL LAYERS," Attorney's Docket AM9-97-146, filed same date herewith, by Alessandro Callegari et al., which application is incorporated by reference herein.

FIELD OF THE INVENTION

The present invention relates to the formation of an alignment film for a liquid-crystal display (LCD) device and, more particularly, to a method for depositing an alignment film using dry processing techniques and aligning the deposited film using an atomic beam alignment procedure.

BACKGROUND OF THE INVENTION

A liquid-crystal display (LCD) device includes liquid-crystal cells with liquid-crystal between transparent electrodes formed on opposed glass plates, or includes liquid-crystal cells with liquid-crystal between a transparent electrode on a glass substrate and a reflective electrode on a non-transparent substrate. By applying an electrical signal between the electrodes, the LCD device is capable of modulating incident light and displaying information. For obtaining contrast, it is necessary to uniformly control the orientation of the liquid-crystal molecules. In a field-effect system such as a nematic system which is designed to twist the liquid-crystal molecules by about 0° to 360° between the upper and lower plates, it is preferable to orient the liquid-crystal molecules parallel to the substrate surface and in a unidirectional manner.

There are many techniques to align liquid-crystals. They include stretching a polymer, rubbing it, depositing it in the form of a Langmuir Blodgett film, and exposing the film to UV radiation. There are also techniques in which particles of SiO are deposited on substrates or grooves are etched using microlithography. All such techniques have drawbacks.

The preferred technique has been to deposit an alignment film formed of polyimide on each transparent elect rode to orient the liquid-crystal, to rub or abrade the polyimide film with a gigged, flocked or velvet cloth in a desired direction and, subsequently, to clean the film before assembling the transparent substrates to form a liquid-crystal cell. The alignment film is an insulating layer whose atomic structure (i.e., molecules) is thus aligned in a predetermined direction to orient the liquid-crystal molecules in the predetermined direction.

The process of forming a polyimide film includes initially applying a wet coat of polyimide to a substrate. This can be accomplished by known printing or spinning techniques. The wet coat is then baked to form a polyimide film on the substrate. Thereafter, the film is run through a roller to even out the surface of the film. The film is then rubbed followed by a cleaning process to remove debris left by the rubbing process. Such a process requires numerous steps (as described above) and is time consuming and costly. Accordingly, there is a need to provide an alignment film that can be formed on a substrate more efficiently and cost effectively.

Once a polyimide film is deposited on a substrate, its atomic structure must be aligned in a predetermined direction to orient the liquid-crystal in a predetermined direction. As discussed above, this is typically accomplished by rubbing the film in a desired direction. The rubbing method has several drawbacks. The rubbing pressure introduces debris and requires cleaning steps and hence is not readily compatible with clean room processing. Moreover, in an LCD which uses an active, switching element array such as a TFT (thin film transistor) or MIM (metal-insulating layer-metal) element, the static electricity caused by rubbing the treated electrode plate may damage the semiconductor switching elements.

Another problem with the rubbing method is that, as the electrode plate is rubbed with a rubbing cloth, fibers and impurities contained in the cloth are attached to the alignment film, thereby degrading the LCD. This necessitates cleaning the LCD with a large quantity of cleaning solvent. The rubbing action also causes impurities and fibers to be released into the surrounding environment. Since it is necessary to perform the film deposition steps in a clean room environment, the rubbing step must be performed in a different location than the film deposition step. The requirement of a separate room for rubbing the film increases the overall manufacturing time and cost of an LCD.

One approach to improve the method of aligning an alignment film is found in U.S. Pat. No. 5,030,322 to Shimada et al, which discloses a method of etching a polyimide alignment film, using ion radiation, to orient the liquid-crystal molecules. Although the Shimada patent provides an improved alignment method over the prior art rubbing method, it does not provide a solution to the numerous steps required to deposit the alignment film, such as applying a wet coat, baking the wet coat to form the alignment film and running the alignment film through a roller.

There is a need to provide an efficient low cost method of both depositing and aligning an alignment film on a substrate of an LCD. There is also a need to provide an alignment procedure that is reliable and suitable for use in LCDs.

Accordingly, it is an object of the present invention to provide a reliable liquid-crystal display (LCD) which requires fewer steps and less cost to produce than the prior art.

It is a further object of the present invention to provide an improved alignment film which is easy to manufacture, reliable, and comparable in performance to alignment films of the prior art.

SUMMARY OF THE INVENTION

The present invention is a method for forming a liquid-crystal cell of a liquid-crystal display. Initially, a dry processed alignment film is deposited onto a first transparent substrate using a dry processing technique, such as plasma enhanced chemical vapor deposition (PECVD). The dry processed alignment film is then irradiated with a beam of atoms to arrange the atomic structure of the alignment film in at least one desired direction in order to orient the liquid-crystal molecules. Another dry processed alignment film is deposited on a second transparent substrate or a non-transparent substrate using a dry processing technique and, likewise, irradiated with a beam of atoms. The first transparent substrate film has spacer balls (preferably of approximately 5.0µ diameter) applied and, the first transparent substrate and the second substrate are then sandwiched together with their respective alignment films spaced adjacent to each other. The space between the films is then filled with a liquid-crystal material.

Various film materials may be employed in conjunction with dry processing techniques to form alignment films suitable for use in LCDs. The film materials must be optically transparent and amorphous or fine-grained. It has been discovered that such materials may include hydrogenated diamond-like carbon (DLC), amorphous hydrogenated silicon, SiC, $SiO_2$, glass, $Si_3N_4$, $Al_2O_3$, $CeO_2$, $SnO_2$ and $ZnTiO_2$. In general, materials exhibiting ionic or partially ionic, covalent or partially covalent bonding and possessing the requisite optical transparency and amorphous or fine grained structure would be suitable for forming such alignment films. The above materials can be used to form alignment films that, at a minimum, are comparable in performance to polyimide films of the prior art, but that require fewer steps and are less costly to manufacture.

The present invention also provides a method for increasing the thickness of the alignment film without sacrificing the optical characteristic of the film. This is accomplished by adding an additional element, such as hydrogen, to the alignment film which increases its optical transparency. In this way, thicker alignment films can be formed with suitable optical transparency characteristics. Such an arrangement thus provides greater design flexibility in the manufacturing of liquid-crystal cells of LCDs.

DETAILED DESCRIPTION OF THE INVENTION

Before proceeding with a detailed description of the present invention, it is well to define certain terms to be used herein. The term dry processing technique will hereinafter refer to any non-aqueous gaseous environment deposition process by which a film can be deposited on a substrate, such as evaporation, sputtering, ion beam deposition, chemical vapor deposition, plasma enhanced chemical vapor deposition (PECVD) and so forth. The term dry processed film refers to any film that is deposited using a dry processing technique.

The present invention relates to an improved method of forming and aligning an alignment film on transparent substrates of LCDs. The present invention employs a dry processing technique, such as PECVD, to deposit an amorphous alignment film on the transparent substrates. The present invention also aligns the atomic structure of the dry processed alignment film in at least one desired direction through use of an atomic beam device. Such an arrangement provides a dry processed alignment film which is comparable in performance to polyimide films of the prior art, but does not require the additional steps of applying a wet coat of the film material, baking the wet coat to form the film, running the film through rollers, rubbing the film and cleaning the film. Moreover, such an arrangement also provides a faster and more low cost method of depositing and aligning the alignment films, than the prior art.

Figure 1:
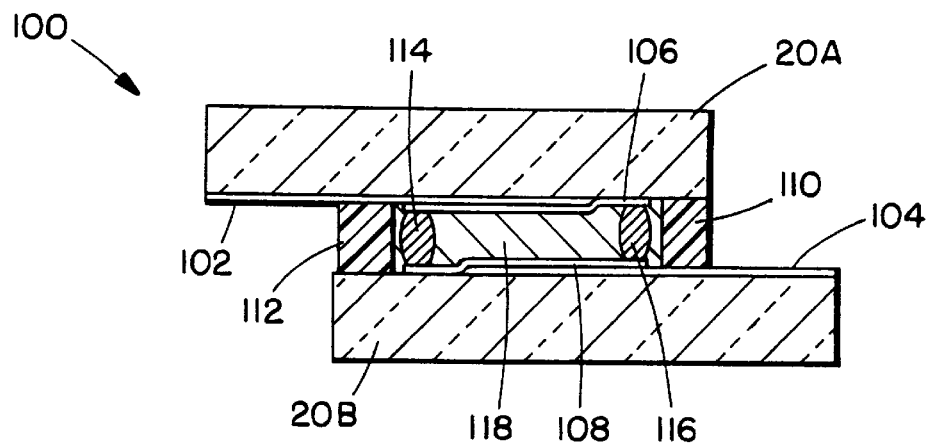
FIG. 1 illustrates a liquid-crystal cell of an LCD, in accordance with the present invention.

Referring to FIG. 1, a liquid-crystal cell 100 includes a pair of substrates, preferably glass plates, 20A and 20B which serve as a twisted nematic cell. Liquid-crystal cell 100 further includes transparent electrodes 102 and 104 located on respective substrates 20A and 20B; dry processed alignment films 106 and 108; sealing resin 110 and 112; spacers 114 and 116 (i.e., glass beads or plastic sphere) and twisted nematic liquid-crystal 118. Substrates 20A and 20B can be bonded together with the use of an adhesive, such as glue. It is preferred that the alignment film surfaces of substrates 20A and 20B are separated from each other by a space of approximately 5 $\mu$m, by spacers 114 and 116. Liquid crystal 118 is sandwiched between alignment layer 106 and 108.

The components of nematic liquid-crystal cell 100 are generally known in the art, except for the particular material of alignment films 106 and 108 and the process by which the films are deposited on respective substrates 20A and 20B, both of which are described in detail below.

Various types of films may be employed in conjunction with dry processing techniques to form alignment films suitable for use in LCDs. However, in order for a film to be suitable for use in LCDs, the film must be optically transparent and amorphous or fine grained. The term amorphous means that the atomic structure of the film has no preferred direction or orientation.

Based on the above factors, it has been discovered that the following film materials can be employed to form a suitable alignment film: hydrogenated diamond-like carbon (DLC), amorphous hydrogenated silicon, SiC, $SiO_2$, glass, $Si_3N_4$, $Al_2O_3$, $CeO_2$, $SnO_2$ and $ZnTiO_2$. These materials can be used to form alignment films that, at a minimum, are comparable to polyimide films of the prior art, but that require fewer steps and less cost to manufacture. It should be understood that any type of film material may be used so long as the formed film is optically transparent, particularly in the visible spectrum.

In the preferred embodiment, alignment films 106 and 108 are formed of hydrogenated DLC. The hydrogenated DLC film is preferably deposited using a PECVD process, and is aligned using an atomic beam that is scanned in a predetermined direction. That is, an atomic beam is employed to arrange or align the atomic structure of the alignment film in at least one desired direction such that, when an LCD cell is formed, the liquid-crystal molecules orient to the predetermined direction of the alignment films. The preferred embodiment is described in detail below with reference to FIGS. 2 and 3.

Figure 2:
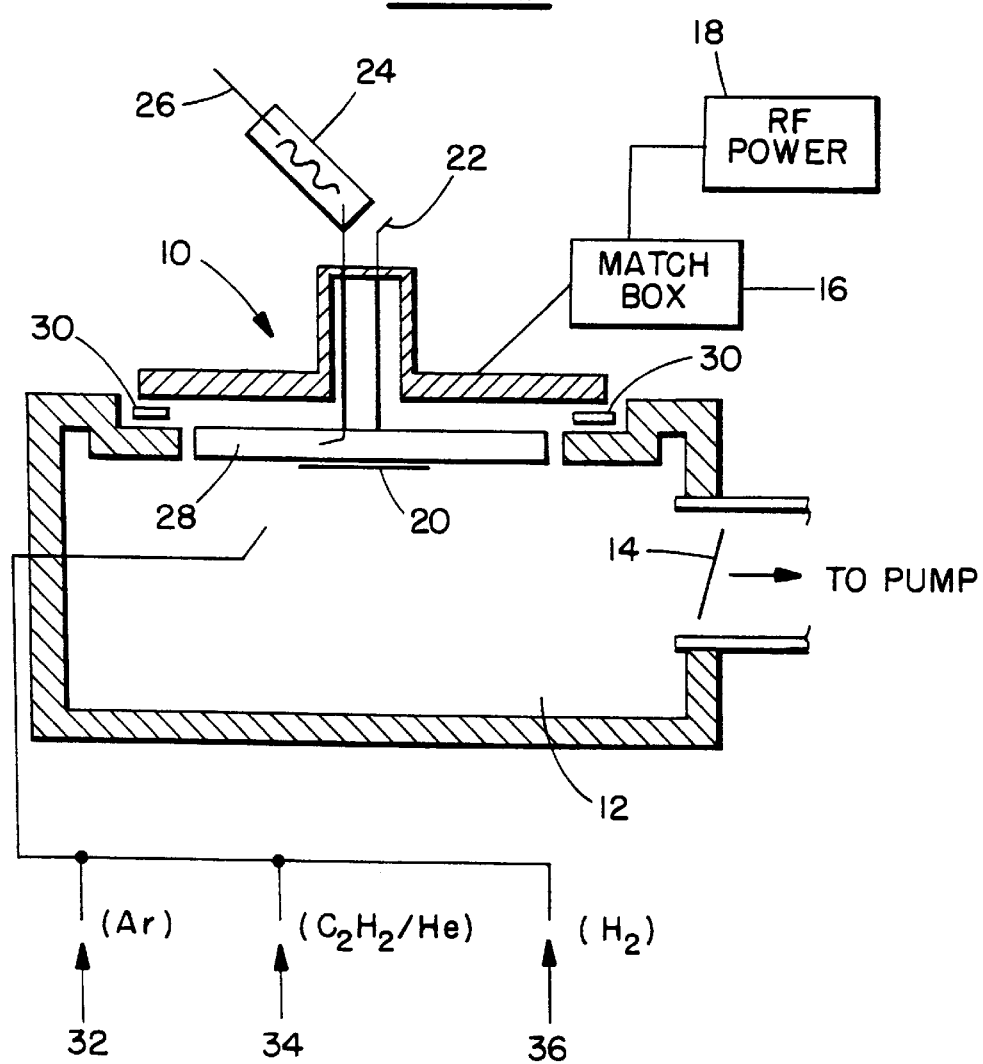
FIG. 2 illustrates a diagram of a plasma enhanced chemical vapor deposition (PECVD) device for depositing an alignment film of an LCD, in accordance with the present invention.

Referring to FIG. 2, there is shown a preferred PECVD processing apparatus 10, for depositing an alignment film, such as hydrogenated DLC, on a substrate 20. Apparatus 10 includes a reactor chamber 12 having a throttle valve 14 which separates reactor chamber 12 from a vacuum pump (not shown). A cathode 28 is mounted to reactor chamber 12 and is isolated therefrom by a dielectric spacer 30. Cathode 28 is provided with a heater 24, an inlet of $N_2$ gas 26 and an exhaust for $N_2$ gas. Substrate 20 is attached to an inner end of cathode 28. Cathode 28 is electrically connected to a radio frequency (RF) source 18 which may be regulated, and the impedance between cathode 28 and RF source 18 is matched by utilizing an impedance matching device 16.

Reactor chamber 12 also includes conduits 32 and 34 which introduce various materials into reactor chamber 12. For example, pre-mixed hydrocarbon helium gas mixture (i.e., $C_2H_2$/He) and hydrogen ($H_2$) can be introduced into reactor chamber 12 through conduit 34 and 36, respectively, while argon (Ar) gas for cleaning substrate 20 is introduced through conduit 32.

To form a hydrogenated DLC alignment film, the hydrocarbon gas may be any hydrocarbon compound which is first capable of being gaseous and is able to form a plasma at the reaction conditions employed by the present process. The term hydrocarbon implies that the molecules which make up the compound contain carbon and hydrogen atoms. The present process may also utilize saturated or unsaturated hydrocarbon compounds. By definition, a saturated hydrocarbon compound is a compound whose molecules contain only carbon single bonds, while an unsaturated compound is a compound whose molecules contain carbon double or triple bonds.

It is preferred that the hydrocarbons are alkanes, alkenes and alkynes. An alkane is defined herein as a compound whose molecules contain only single bonds between carbon atoms, such as methane, ethane, propane, butane and the like thereof. Alkenes are defined herein as compounds whose molecules contain a carbon—carbon double bond, such as ethene, propene, n-butene and the like thereof. Finally, an alkyne compound is defined herein as a hydrocarbon whose molecules contain a carbon—carbon triple bond, such as acetylene, propyne, 1-butyne, 2-butyne and the like thereof. However, it should be noted that mixtures of hydrocarbon gases, such as acetylene/methane, may also be employed to form the alignable DLC alignment film of the present invention.

In order to obtain an hydrogenated DLC alignment film with high thermal stability, the hydrocarbon gas is preferably diluted with helium. The term diluted is defined herein as an admixture of a hydrocarbon (i.e., $C_2H_2$) with helium, such that the final concentration of the hydrocarbon in the admixture constitutes preferably from about 0.5% to about 90% of the admixture. It is also preferred that the hydrocarbon is diluted with helium such that the final concentration of hydrocarbon in the admixture is from about 2% to about 50%.

Gases employed by the present invention have a purity greater than about 95.5%, but preferably in the range from about 98.5% to about 99.99%. The high purity gases are pre-mixed in the same gas cylinder before being introduced in reaction chamber 12. The gas mixture is introduced into reaction chamber 12 by first passing it through a flow controller at a sufficient flow to provide a total pressure of hydrocarbon and helium from about $1 \times 10^{-3}$ Torr to about $600 \times 10^{-3}$ Torr. It is preferred that the pressure of hydrocarbon helium mixture be about $20 \times 10^{-3}$ Torr to $200 \times 10^{-3}$ Torr. The above conditions can also be obtained by introducing each gas separately through flow controllers providing the desired partial pressures.

Substrate 20 (generally denoting substrates 20A and 20B of FIG. 1) can be a transparent material, such as glass, plastic or any material suitable for use in a LCD cell. Substrate 20B (FIG. 1) can also be a non-transparent material, such as Si-based substrate for reflective display panels. Substrate 20 is mounted on a RF cathode 28 inside reaction chamber 12 of PECVD apparatus 8. Reaction chamber 12 is then tightly sealed and evacuated until a partial pressure reading of preferably about $1 \times 10^{-5}$ Torr or below is obtained. After evacuating reaction chamber 12 to a desired pressure range, substrate 20 is preferably maintained at room temperature 24° C.

Depending on the type of substrate used, the material may or may not be subjected to in-situ plasma cleaning prior to depositing the diamond-like carbon film. However, if desired, the following cleaning techniques may be employed, such as $H_2$, Ar, $O_2$ and $N_2$ plasma sputter etching techniques. In the present case, it is preferred that substrate 20 is precleaned for about 1.0 minute in an Ar plasma at a pressure of about $5 \times 10^{-7}$ Torr and a RF power density of approximately 0.31 W/cm².

After achieving and maintaining the desired temperature, the admixed gas is introduced into reaction chamber 12 at an appropriate flow rate, preferably about 10 to 100 sccm. The admixture is introduced into reaction chamber 12 at an appropriate pressure, preferably about $1 \times 10^{-3}$ Torr to $1000 \times 10^{-3}$ Torr. In the preferred embodiment, the gases are introduced in reactor chamber 12 at a flow of about 25 sccm for the hydrocarbon mixture (i.e., acetylene/helium or $C_2H_2$/He) and about 15 sccm for the $H_2$ gas.

In order to obtain a plasma of the gas mixture, the cathode bias is held fixed at an appropriate voltage depending on the gas mixture. It is preferred that the voltage is from about −20 V to −300 V, but more preferably at about −125 V, throughout the deposition process. This voltage is supplied to RF cathode 28 by using an RF choke-isolated DC power supply source. To minimize damage to substrate 20 during the deposition process, a low RF power density should be utilized. Typically, this involves applying an RF power density from about 3 to 20 mW/cm², preferably about 15 mW/cm².

The hydrogenated DLC alignment film is then deposited onto substrate 20 at a rate, such that an essentially continuous coating of the film on the substrate is obtained. By employing the above-mentioned operation parameters, the hydrogenated DLC alignment film can be deposited onto the substrate at a rate of about 5 Å/min to 10,000 Å/min.

In accordance with the present invention, the hydrogenated DLC alignment film deposited on the substrate can range from about 10 to 10,000 Å thick, preferably from about 10 to 100 Å thick. The optical transparency of the hydrogenated DLC alignment film can be controlled by varying the resultant thickness. Thus, the optical transparency of the hydrogenated DLC alignment film can be varied by merely increasing or decreasing its thickness. For example, a thickness of approximately 60 Å is sufficient for obtaining over 90% transmittance through the visible spectrum.

Hydrogenated DLC alignment films deposited in accordance with the process of the present invention are characterized as being amorphous, thermally stable, electrically insulating and optically transparent. Additionally, the hydrogenated DLC alignment films deposited by PECVD from a hydrocarbon/helium gas mixture have a dielectric strength comparable to that normally associated with diamond films. The diamond-like carbon film deposited from a hydrocarbon/helium gas mixture in accordance with the present invention has a dielectric strength close to 10 MV/cm.

Figure 3:
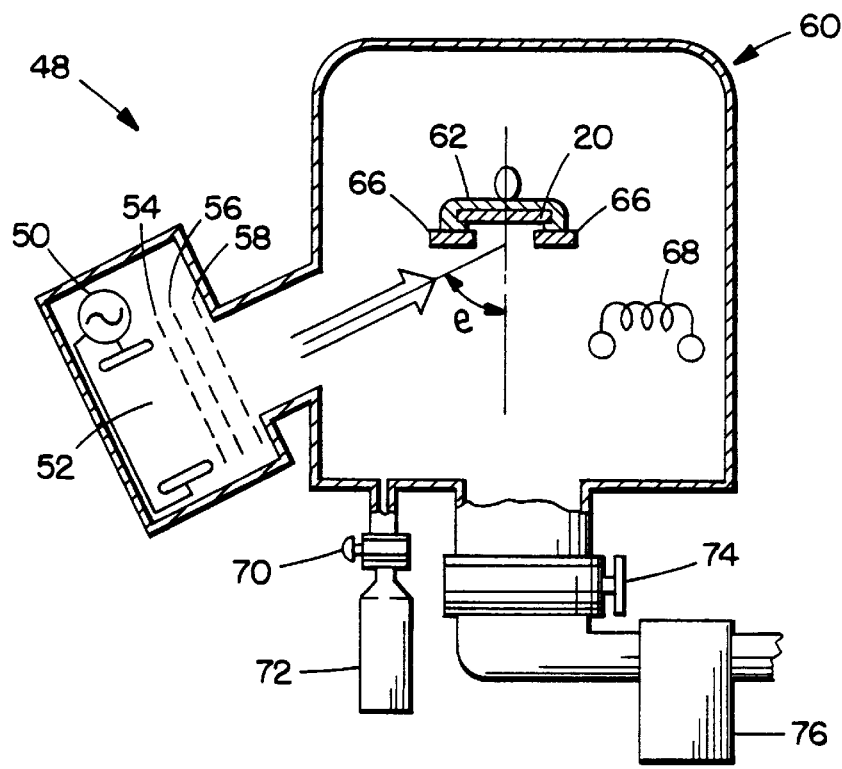
FIG. 3 illustrates a diagram of an atomic beam alignment device for orienting a dry processed alignment film of FIG. 2, in accordance with the present invention.

Referring to FIG. 3, there is provided an atomic beam alignment device 48 for aligning an atomic structure of an alignment film (e.g., hydrogenated DLC film) in at least one desired direction or orientation through the use of ion radiation. As is generally understood, the alignment film serves to orient the direction of the liquid-crystal. That is, when a liquid cell is formed, the molecules of the liquid-crystal align along the direction(s) provided by the atomic structure of the alignment films. Accordingly, atomic beam 48 can be used to radiate ions at the alignment film to disturb (i.e., to break bonds) and align the atomic structure of the alignment film in a desired direction or orientation, such as in a horizontal, unidirectional or multidirectional manner. A mask with features etched into it can also be used to selectively align a local area, thus leading to the fabrication of domains of alignment. These can then be used to fabricate a multidomain display, which has vastly superior viewing attributes. For multidirectional alignment, it is preferred that the multidirections are selected in such a fashion that results in a multidomain device.

As shown in FIG. 3, atomic beam device 48 includes a bell jar 60, an alternating current (AC) or direct current (DC) power source 50 and a group of three electrodes. The three electrodes include an accelerating electrode 54, a pulling electrode 56 and an earth electrode 58 through which ions are extracted that are generated by plasma generating unit 52. Although three electrodes are described above, the present invention may also utilize two electrodes to generate a beam of atoms, (e.g., a two-gridded ion optic set). Atomic beam device 48 further includes a plate fixing platform 62 located within bell jar 60; substrate 20 fixed on plate fixing platform 62 and having an alignment film thereon; a neutralization filament or device 68 (positioned in the path of the atomic beam) or the equivalent thereof; and a gas flow rate control unit 70. Atomic beam device 48 may further include a mask 66 covering the surrounding of substrate 20.

Plasma generating unit 52 serves to generate ions with the group of three electrodes 54, 56 and 58 extracting ions and irradiating substrate 20. Gas supply 72 is connected to the vacuum chamber 60 through a gas flow controller 70. Substrate 20 is fixed on plate fixing platform 62 in a manner to maintain an angle θ which is the angle of incidence of the accelerated grains with respect to a line that is normal to substrate 20. The angle θ preferably ranges from about 20° to 80°.

In operation, vacuum pump 76 serves to evacuate bell jar 60, through a valve 74, preferably to an extent of $1 \times 10^{-5}$ Torr to $2 \times 10^{-5}$ Torr. Thereafter, a gas is introduced to bell jar 60 through gas flow rate control unit 70. The gas may be a noble or inert gas, such as helium (He), argon (Ar), Neon (Ne), krypton (Kr) or Xenon (Xe); an admixture of a noble gas with an active gas, such as nitrogen, fluorine, a fluorocarbon, or a hydrocarbon; nitrogen; oxygen; or combinations thereof. Plasma generating unit 52 is then operated at an appropriate pressure, preferably at about $1 \times 10^{-4}$ Torr to $1 \times 10^{-5}$ Torr, so that the introduced gas enters into a plasma state. An appropriate voltage, preferably about 75 V to 200 V, is then applied to accelerating electrode 54 which serves to apply kinetic energy to the ions extracted from the plasma.

It should be noted that the orientation or direction of the alignment film can be adjusted by selecting an appropriate angle of incidence θ, voltage applied to the accelerating electrode, amount of exposure time and so forth. The alignment film of substrate 20 is preferably exposed to the aligning ion radiation for about 5 seconds to 2 minutes for DLC films.

However, it should be noted that the radiating ions may cause charge to collect on the alignment film. Since the alignment film serves as an insulating layer, neutralization filament or device 68 or the equivalent thereof (such as a plasma bridge neutralizers or hollow cathodes) is employed to emit thermal electrons to neutralize the ions. This design allows an array of non-linear display elements, such as TFT or MIM, to be present on the substrate, since it does not generate such static electricity as to damage the non-linear elements.

Although the step of depositing the film and the step of aligning the film are described above as being performed in separate chambers, it should be understood that both steps may be performed in the same chamber, room or location. It is also important to understand that the above process may be employed with dry processing techniques other than PECVD. The alignment film may also be a dry processed film other than hydrogenated DLC, such as amorphous hydrogenated silicon, carbon nitride, boron nitride, SiC, $SiO_2$, glass, $Si_3N_4$, $Al_2O_3$, $CeO_2$, $SnO_2$ and $ZnTiO_2$ or any other dry processed film suitable for use in LCDs. Any type of dry processed film may be employed so long as it is optically transparent (particularly in the visible spectrum), and amorphous or fine-grained. It should also be understood that the step of depositing the film and the step of aligning the film is applicable both to transparent substrates for transmissive displays or transmissive light valves, and to the transparent substrate combined with a non-transparent substrate for reflective displays or reflective light valves.

DISPLAY CHARACTERISTICS OF DLC FILM

Various experiments were conducted on hydrogenated DLC film to determine its suitability as an alignment film. The experiments were performed to ascertain whether DLC alignment films provided the necessary display characteristics required of alignment films. The display characteristics include optical transparency, electrical insulating quality, pretilt angle, anchoring energy, charge retention, quality of a gray scale in an LCD and image deterioration. Through such experimentation, it was determined that dry processed hydrogenated DLC film provides comparable performance to wet coated polyimide films of the prior art. The results of the experiments are discussed below with reference to FIGS. 4 through 8 and Table I.

TABLE I

Transmission Percentage of DLC alignment film on Glass/ITO Plate

| | Hydrogen Content | WAVELENGTH (nm) | | |
|---|---|---|---|---|
| | | 620 nm | 540 nm | 450 nm |
| 40 Å, Standard DLC | 26.0% | 96.16% | 93.92% | 90.12% |
| 40 Å, Hydrogenated DLC* | 30.0% | 98.62% | 97.67% | 95.76% |
| 50 Å, Hydrogenated DLC* | 30.0% | 97.81% | 96.36% | 93.58% |
| 75 Å, Hydrogenated DLC | 30.0% | 98.38% | 94.46% | 90.78% |

*the tested hydrogenated DLC alignment film has an approximately 30% hydrogen content.

With regard to optical transparency, the optical transmission characteristic of DLC alignment films were examined as a function of thickness and hydrogen content. Table I shows that by increasing the hydrogen (H) content, the optical transmission also increases. This information is provided in Table I. As shown in Table I, transmission percentages for hydrogenated DLC alignment films are well above 90% in the visible spectrum. Hydrogenated DLC films are thus optically transparent and are suitable for use as an alignment film of a LCD cell. The diamond-like carbon structure of hydrogenated DLC films also provides a film that is electrically insulating.

Figure 4:
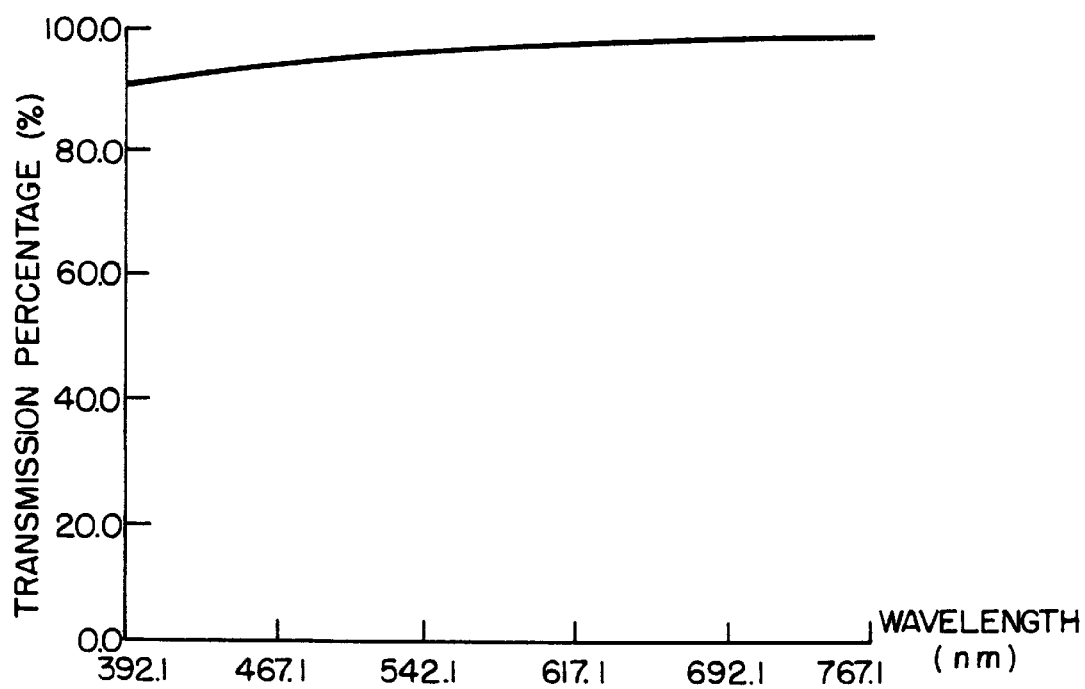
FIG. 4 illustrates a graph of transmission versus wavelength for a hydrogenated DLC film of the present invention.

For a standard DLC alignment film (i.e., with a hydrogen content of about 26%) having a 40 Å thickness, the transmission percentage of a 630 nm wavelength is about 96.16%, of a 540 nm wavelength is about 93.92%, and of a 450 nm wavelength is 90.12%. As shown in Table I, at higher hydrogen content DLC films have an increased transmission percentage over a standard DLC with the same thickness. In particular, hydrogenated DLC with a thickness of 40 Å and a hydrogen content of about 30% has a transmission percentage of 98.62% for a 620 nm wavelength, 97.67% for a 540 nm wavelength, and 95.76% for a 450 nm wavelength. Hydrogenated DLC films with a thickness of about 50 Å and 75 Å also have improved optical characteristics over the above standard DLC with a smaller thickness and lower hydrogen content. A graph of the transmission percentage versus the wavelength for hydrogenated carbon film with a 50 Å thickness is shown in FIG. 4. The transmission percentage of a 50 Å hydrogenated DLC film is about 90% for a wavelength of 392.1 nm and increases with the wavelength.

Accordingly, thicker alignment films can be employed with suitable optical transparency by either increasing the hydrogen content (as in this case) or adding another element. In this way, thicker alignment films may be employed without sacrificing the optical characteristic of the film. Such an arrangement thus provides greater design flexibility in the manufacturing of LCD cells.

Figure 5:
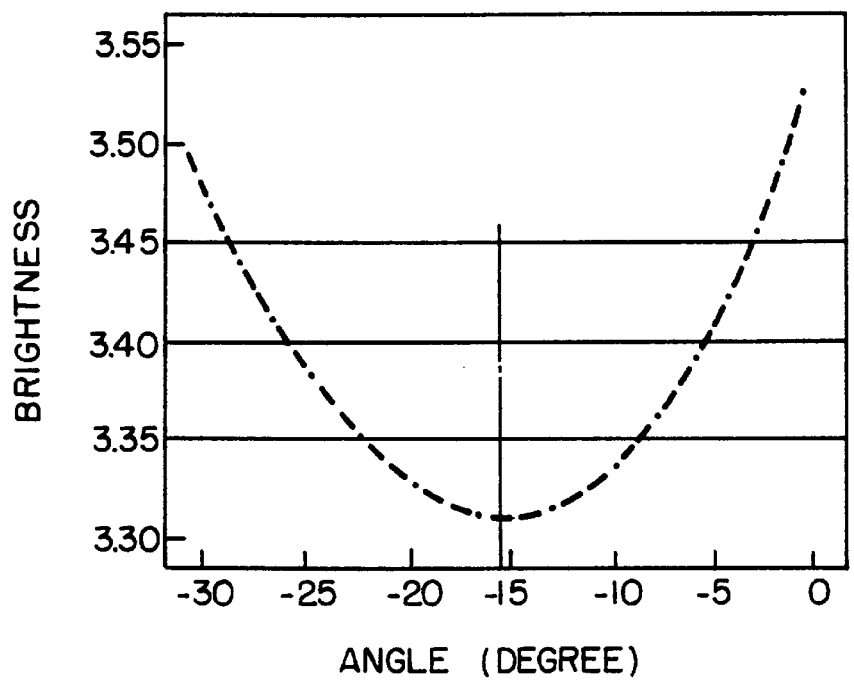
FIG. 5 illustrates a pretilt angle measurement graph of optical transmission versus cell rotation angle for a LCD cell with a hydrogenated DLC film of the present invention, used as the LC alignment layer.

FIG. 5 illustrates a graph of the pretilt angle of a LCD cell with a DLC alignment film. This pretilt angle is determined from optical transmission vs. cell rotation, as shown in FIG. 5. The pretilt angle relates to the angle at which the molecules of the hydrogenated DLC alignment film are naturally oriented with respect to the substrate. For good display characteristics, the pretilt angle should be greater than 2 to 2.5 degrees(°). As shown in FIG. 5, the pretilt angle of the hydrogenated DLC alignment film having a thickness of 50 Å and a hydrogen content of about 30% is at least 3.0 degrees(°). The pretilt angle can be deduced from the minimum point of the graph of FIG. 5, which, in this case, is about 3.3 degrees(°).

Measurements were also performed to determine the anchoring energy and charge retention of a hydrogenated DLC film. Anchoring energy relates to the binding strength between a liquid-crystal and an alignment film surface. If the anchoring energy is too low, the LCD cannot function properly. It is known that the anchoring energy of rubbed polyimide, about 1.4 N/m (where N=Newtons), is adequate for use in LCDs. For hydrogenated DLC films, the anchoring energy was determined to be about 2 N/m which is greater than that of the prior art films. Hydrogenated DLC films are thus viable candidates as alignment films.

With respect to charge retention, the hydrogenated DLC alignment film of the present invention was also determined to be comparable to that of rubbed polyimide film.

Figure 6:
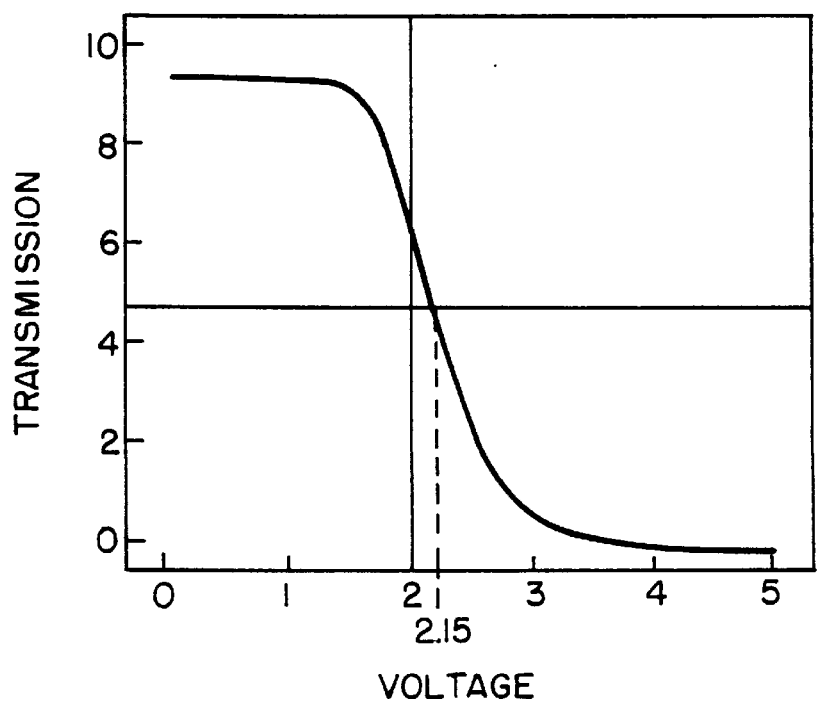
FIG. 6 illustrates a graph of the optical transmission versus voltage for a LCD cell with a hydrogenated DLC film of the present invention, used as the LC alignment layer.

Referring to FIG. 6, there is shown a graph of the variation of the transmission of light versus voltage to determine the quality of a gray scale in an LCD employing DLC alignment films. As shown in FIG. 6, the transmission of light gradually changes from about 1.5 V to 3.0 V with a transmission switching point at about 2.15 V. The above transmission characteristics (as shown in FIG. 6) are comparable to the best polyimide films. Therefore, hydrogenated DLC alignment films provide a gray scale quality comparable to that of the best polyimide films.

Figure 7:
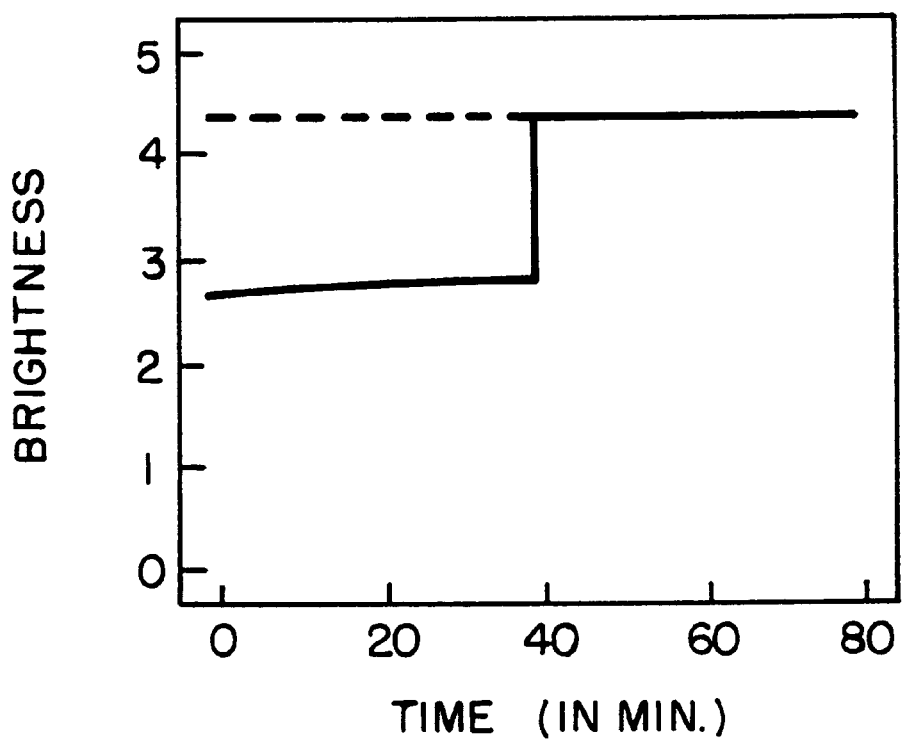
FIG. 7 illustrates a image sticking measurement graph of the optical transmission for a DLC cell with a hydrogenated DLC film of the present invention, used as the LC alignment layer.

Another significant characteristic for an alignment film relates to image deterioration associated with residual voltages build up over time, when an LCD is in an ON state. This problem is commonly referred to as the image sticking problem and can be quantified in terms of brightness versus time. As shown in the graph of FIG. 7, there is no measurable sticking problem with hydrogenated DLC alignment films. That is, the brightness value of an LCD cell with hydrogenated DLC alignment films abruptly changes when turned ON or OFF (i.e., a step change) which indicates no image deterioration over time.

The invention having thus been described with particular reference to the preferred forms thereof, it will be obvious that various changes and modifications may be made therein without departing from the spirit and scope of the invention as defined in the appended claims.

We claim:

1. A method for forming a transparent film on a substrate wherein said film exhibits an aligned molecular structure, the method comprising the steps of:

a) depositing an amorphous, nonpolymeric film of about 10 to 100 Angstroms thickness on a transparent substrate through use of a non-aqueous gaseous environment deposition process; and b) irradiating the deposited film with a beam of atoms at a designated angle to arrange an atomic structure of said film into at least one aligned predetermined direction, said beam of atoms being accelerated by an applied voltage within a range of about 75 to 200 volts.

2. The method as recited in claim 1, wherein said film is deposited on said substrate using the non-aqueous gaseous environment deposition process selected from the group consisting of evaporation, sputter deposition, ion beam deposition, chemical vapor deposition, and plasma enhanced chemical vapor deposition.

3. The method as recited in claim 1, wherein said film is deposited on said substrate using plasma enhanced chemical vapor deposition.

4. The method as recited in claim 1, wherein said film is optically transparent in the visible spectrum.

5. The method as recited in claim 4, wherein said film has a transmission percentage greater than approximately 90 percent in the visible spectrum.

6. The method as recited in claim 1, wherein said film is formed of a material exhibiting a bonding characteristic selected from the group consisting of ionic bonding, partial ionic bonding, covalent bonding and partial covalent bonding.

7. The method as recited in claim 1, wherein said film is formed of a material selected from the group consisting of hydrogenated diamond-like carbon film, amorphous hydrogenated silicon, SiC, $SiO_2$, glass, $Si_3N_4$, $Al_2O_3$, $CeO_2$, $SnO_2$ and $ZnTiO_2$.

8. The method as recited in claim 1, wherein said film is a hydrogenated diamond-like carbon film having a hydrogen content and a thickness, such that said film is optically transparent in the visible spectrum.

9. The method as recited in claim 1, wherein the step (b) comprises the steps of:

exciting a gas to a plasma state; and applying energy to ions existing in the plasma state to generate the beam of atoms.

10. The method as recited in claim 9, wherein the gas is selected from a group consisting of a noble gas, an admixture of a noble gas with an active gas, nitrogen, fluorine, a fluorocarbon, a hydrocarbon, oxygen and combinations thereof.

11. A method for forming an LCD cell, comprising the steps of:
  forming a first transparent film on a first transparent substrate through the use of the method recited in claim 1;
  forming a second transparent film on a second transparent substrate through the use of the method recited in claim 1;
  sandwiching the first transparent substrate and the second transparent substrate with their respective first and second films spaced adjacent to each other; and
  filling a space between the first and second films with a liquid-crystal material.

12. A liquid-crystal display device comprising:
  a) a pair of substrates, each having a surface thereon spaced adjacent to each other;
  b) a transparent patterned or non-patterned conduction layer disposed over the surface of each substrate;
  c) a first transparent, amorphous, nonpolymeric film of about 10 to 100 Angstroms thickness disposed over the transparent patterned conduction layer, wherein the first film is deposited through the use of a non-aqueous gaseous environment deposition process and irradiated with a beam of atoms at a designated angle to arrange an atomic structure of the film into at least one aligned predetermined direction, said beam of atoms being accelerated by an applied voltage within a range of about 75 to 200 volts;
  d) a color filter layer disposed over the other transparent patterned conductor layer;
  e) a second transparent, amorphous, nonpolymeric film of about 10 to 100 Angstroms thickness disposed over the color filter layer, wherein the second film is deposited through the use of a non-aqueous gaseous environment deposition process and irradiated with a beam of atoms at a designated angle to arrange an atomic structure of the second film into at least one aligned predetermined direction, said beam of atoms being accelerated by an applied voltage within a range of about 75 to 200 volts;
  f) a plurality of uniformly sized transparent or non-transparent spacers distributed within the space; and
  g) a filling of liquid-crystal material disposed within the space.

13. The device as recited in claim 12, wherein the first film and the second film are deposited on their respective substrates through the use of a non-aqueous gaseous environment deposition process selected from the group consisting of evaporation, sputter deposition, ion beam deposition, chemical vapor deposition and plasma enhanced chemical vapor deposition.

14. The device as recited in claim 12, wherein the first film and the second film are deposited on their respective substrates using plasma enhanced chemical vapor deposition.

15. The device as recited in claim 12, wherein the first film and the second film are optically transparent in the visible spectrum.

16. The device as recited in claim 15, wherein the first film and the second film have a optical transmission percentage greater than approximately 90 percent in the visible spectrum.

17. The device as recited in claim 12, wherein the first film and the second film are both formed of a material selected from the group consisting of hydrogenated diamond-like carbon film, carbon nitride, amorphous hydrogenated silicon, boron nitride, SiC, $SiO_2$, glass, $Si_3N_4$, $Al_2O_3$, $CeO_2$, $SnO_2$ and $ZnTiO_2$.

18. The device as recited in claim 12, wherein the first film and the second film are both formed of hydrogenated diamond-like carbon film having a hydrogen content and a thickness such that both are optically transparent in the visible spectrum.

19. The device as recited in claim 12, wherein an atomic structure of the first film and the second film are arranged in a unidirectional manner.

20. The device as recited in claim 12, wherein an atomic structure of the first film and the second film are arranged in a multidirectional manner to provide a multidomain device.

21. The device as recited in claim 12, wherein the beam of atoms is generated from a gas selected from the group consisting of a noble gas, an admixture of a noble gas with an active gas, nitrogen, fluorine, a fluorocarbon, a hydrocarbon, oxygen and mixtures thereof.

22. A method for forming an LCD cell, comprising the steps of:
  forming a first transparent, amorphous, nonpolymeric film of about 10 to 100 Angstroms thickness on a transparent substrate through the use of the method recited in claim 1;
  forming a second transparent, amorphous, nonpolymeric of about 10 to 100 Angstroms thickness film on a non-transparent substrate through the use of the method recited in claim 1;
  sandwiching the transparent substrate and the non-transparent substrate with their respective first and second films spaced adjacent to each other; and
  filling a space between the first and second films with a liquid crystal material.

23. A liquid-crystal display device comprising:
  a) a transparent substrate and a non-transparent substrate, each having a surface thereon spaced adjacent to each other;
  b) a transparent patterned or non-patterned conduction layer disposed over the surface of the transparent substrate;
  c) a reflective patterned conduction layer disposed over the surface of the non-transparent substrate;
  d) a first transparent, amorphous, nonpolymeric film of about 10 to 100 Angstroms thickness disposed over the transparent layer, wherein the first film is deposited through the use of a non-aqueous gaseous environment deposition process and irradiated with a beam of atoms at a designated angle to arrange an atomic structure of the first film into at least one aligned predetermined direction, said beam of atoms being accelerated by an applied voltage within a range of about 75 to 200 volts;
  e) a second transparent, amorphous, nonpolymeric film of about 10 to 100 Angstroms thickness disposed over the reflective patterned conduction layer, wherein the second film is deposited through the use of a non-aqueous gaseous environment deposition process and irradiated with a beam of atoms at a designated angle to arrange an atomic structure of the second film into at least one aligned predetermined direction, said beam of atoms being accelerated by an applied voltage within a range of about 75 to 200 volts;
  f) a plurality of uniformly sized transparent or non-transparent spacers distributed within the space; and
  g) a filling of a liquid crystal material disposed within the spacers.

24. The device as recited in claim 23, wherein the first film and the second film are deposited on their respective substrates through the use of a non-aqueous gaseous environment deposition process selected from the group consisting of evaporation, sputter deposition, ion beam deposition, chemical vapor deposition and plasma enhanced chemical vapor deposition.

25. The device as recited in claim 23, wherein the first film and the second film are deposited on their respective substrates using plasma enhanced chemical vapor deposition.

26. The device as recited in claim 23, wherein the first film and the second film are optically transparent in the visible spectrum.

27. The device as recited in claim 26, wherein the first film and the second film have a optical transmission percentage greater than approximately 90 percent in the visible spectrum.

28. The device as recited in claim 23, wherein the first film and the second film are both formed of a material selected from the group consisting of hydrogenated diamond-like carbon film, carbon nitride, amorphous hydrogenated silicon, boron nitride, SiC, $SiO_2$, glass, $Si_3N_4$, $Al_2O_3$, $CeO_2$, $SnO_2$ and $ZnTiO_2$.

29. The device as recited in claim 23, wherein the first film and the second film are both formed of hydrogenated diamond-like carbon film having a hydrogen content and a thickness such that both are optically transparent in the visible spectrum.

30. The device as recited in claim 23, wherein an atomic structure of the first film and the second film are arranged in a unidirectional manner.

31. The device as recited in claim 23, wherein an atomic structure of the first film and the second film are arranged in a multidirectional manner to provide a multidomain device.

32. The device as recited in claim 23, wherein the beam of atoms is generated from a gas selected from the group consisting of a noble gas, an admixture of a noble gas with an active gas, nitrogen, fluorine, a fluorocarbon, a hydrocarbon, oxygen and combinations thereof.

* * * * *